United States Patent [19]
Colson

[11] Patent Number: 5,033,180
[45] Date of Patent: Jul. 23, 1991

[54] BEARING PULLER

[76] Inventor: Fred T. Colson, 1000 Turner St., Clearwater, Fla. 34616

[21] Appl. No.: 558,133

[22] Filed: Jul. 25, 1990

[51] Int. Cl.[5] .................... B23P 19/04
[52] U.S. Cl. .................... 29/259
[58] Field of Search .................... 29/256, 258-263, 29/283

[56] References Cited

U.S. PATENT DOCUMENTS

| | | | |
|---|---|---|---|
| 2,133,697 | 10/1938 | Hansen | 29/263 |
| 2,467,982 | 4/1949 | Maris | 29/263 |
| 3,200,484 | 8/1965 | Garman | 29/263 |
| 4,570,319 | 2/1986 | Skoworodko | 29/259 |
| 4,658,488 | 4/1987 | Johnstead | 29/259 |

*Primary Examiner*—Robert C. Watson
*Attorney, Agent, or Firm*—Joseph C. Mason, Jr.; Ronald E. Smith

[57] ABSTRACT

A bearing puller that pulls an alternator bearing from a shaft. The bearing, when pulled, travels over slip rings on the shaft which are not affected by the pulling action. A "U" shaped frame has a pair of laterally spaced legs with free ends that abuttingly engage a pole piece of the alternator and an elongate screw is threadedly received by the frame so that rotation of the screw translates into axial travel of the screw and a bearing gripper member secured to the screw. The gripper member performs the pulling function when the screw is rotated.

2 Claims, 3 Drawing Sheets

BEARING PULLER

TECHNICAL FIELD

This invention relates, generally, to devices that pull bearings from shafts. More particularly, it relates to a tool that removes the bearing from an automobile alternator.

BACKGROUND ART

Bearings are typically press fit onto shafts by machines, making it difficult for a repair person to pull a worn bearing from its shaft.

Accordingly, inventors have developed numerous tools having utility as bearing pullers. Generally speaking, a bearing-engaging frame has an internally threaded aperture through which extends an elongate externally threaded screw member. The screw bears against the shaft that carries the bearing that is to be pulled so that rotation of the screw effects rearward travel of the frame and hence of the bearing due to the axial immobility of the shaft. There are many variations of this principal, with tools being adapted to fit differing shafts and bearings.

For example, the same principal applies where the shaft is axially movable. In that case, the frame that screw threadedly receives the shaft is stationary as the screw advances. The advancing screw bears against the movable shaft and the shaft recedes from the bearing. An example of this type of bearing puller, which is perhaps more accurately termed a bearing pusher, appears in U.S. Pat. No. 3,887,989 to Maynard.

Of course, many pullers do not remove bearings from shafts at all, but are used to pull apart items that are mounted on shafts in tight press fit relation thereto. In U.S. Pat. No. 3,182,385 to Esposito, the pole pieces of an automobile alternator are pulled apart from one another. A first pole piece is held against axial displacement by a cylindrical frame member, and an elongate screw member drives the shaft that carries both pole pieces away from the first pole piece to accomplish the separation.

In some puller devices, the elongate screw does not bear against the shaft. For example, in German patent no. 1078959 to Muller, a first frame is telescopically received by a second frame. The first frame has a leading end that bears against an immobile surface and the second frame has a leading end that engages the item to be pulled. A screw is screw threadedly received within an internally threaded aperture formed in the second frame and said screw's leading end bears against the first frame and not the shaft. Accordingly, rotation of the screw causes the second frame to retract with respect to the first frame, and said second frame carries the item to be pulled along with it.

Thus, the principals of mechanical extraction have been embodied in differing ways.

Certain automobiles, however, have alternators with a bearing and slip ring design that renders all of the known pullers useless, i.e., none of the known pullers have utility in connection with such designs. Thus, there is a need for a bearing puller having utility in connection with such alternator designs, but the prior art, taken as a whole, neither teaches nor suggests how an efficient puller for such bearings could be built.

DISCLOSURE OF INVENTION

The present invention has only three primary parts, said parts being a rigid "U" shaped frame member having a pair of transversely spaced leg members that bear against a pole piece of the alternator, an elongate externally threaded screw member that is rotatably mounted within an unthreaded bore formed in the frame member, and a bearing gripper member that screw threadedly engages the screw member. The bearing gripper is specifically configured to receive the slip rings and bearing of the alternator assembly. Rotation of the screw effects retraction of the gripper member and the bearing it grips, but the screw does not bear against the shaft upon which the bearing is mounted. The bearing gripper does not grip the slip rings; thus, the bearing is pulled over the slip rings.

The primary object of this invention is to provide a bearing puller of simple yet elegant construction that has utility in connection with the pulling of bearings from a particular type of alternator.

Other important objects, features and advantages of this invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

BEST MODES FOR CARRYING OUT THE INVENTION

Figure 1:
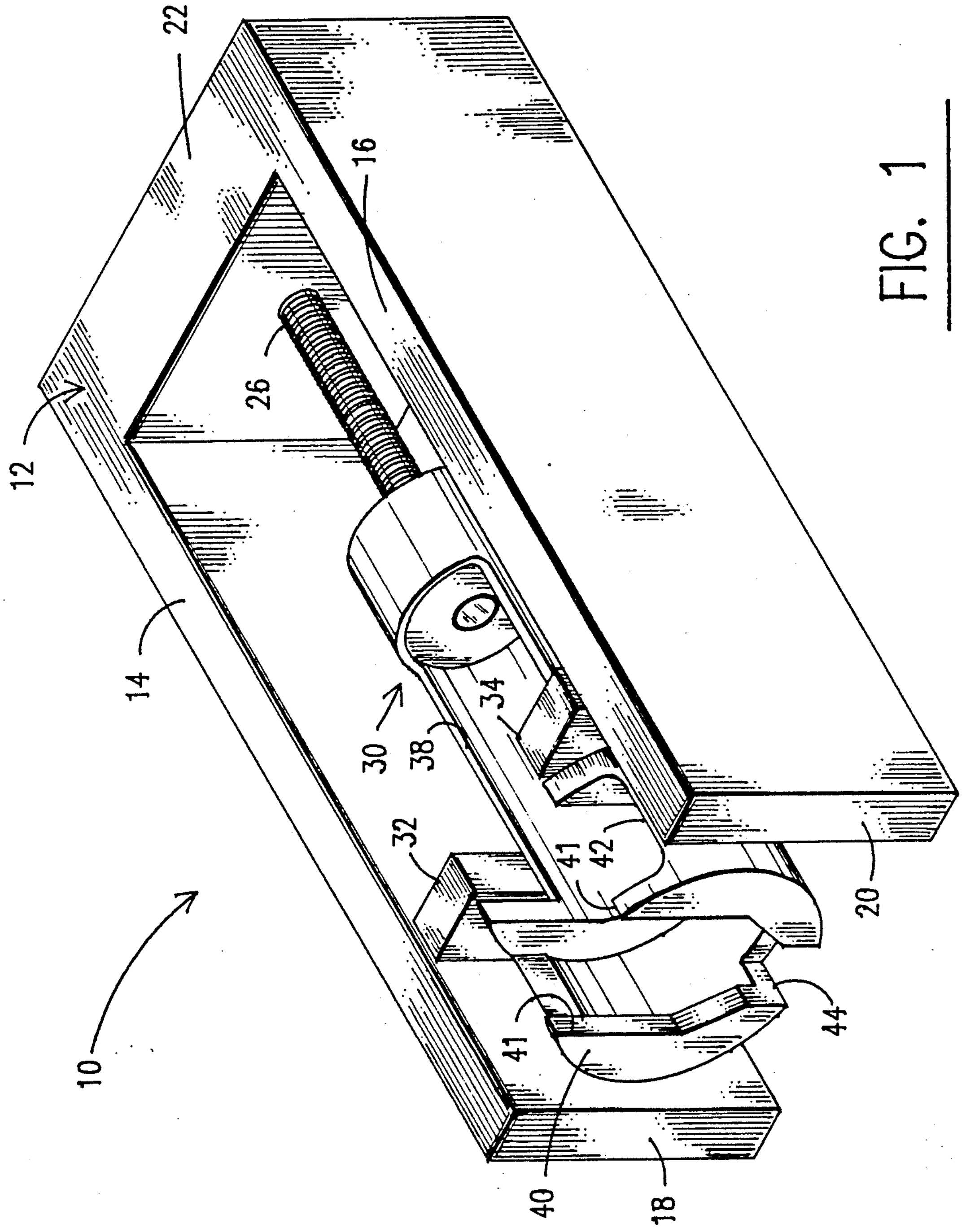
FIG. 1 is a perspective view of an exemplary embodiment of the invention.

Referring now to FIG. 1, it will there be seen that an illustrative embodiment of the invention is denoted by the reference numeral 10 as a whole.

Puller 10 includes a rigid, solid frame 12 which may have a round "U" configuration or a square "U" configuration as depicted. Frame 12 includes a pair of transversely spaced apart leg members 14, 16 that terminate in flat ends 18, 20 respectively. When puller 10 is in use, said flat ends abuttingly engage a flat surface of an alternator pole piece 60 (FIGS. 3 and 4) to prevent axial movement of said pole piece and hence of said alternator.

Figure 2:
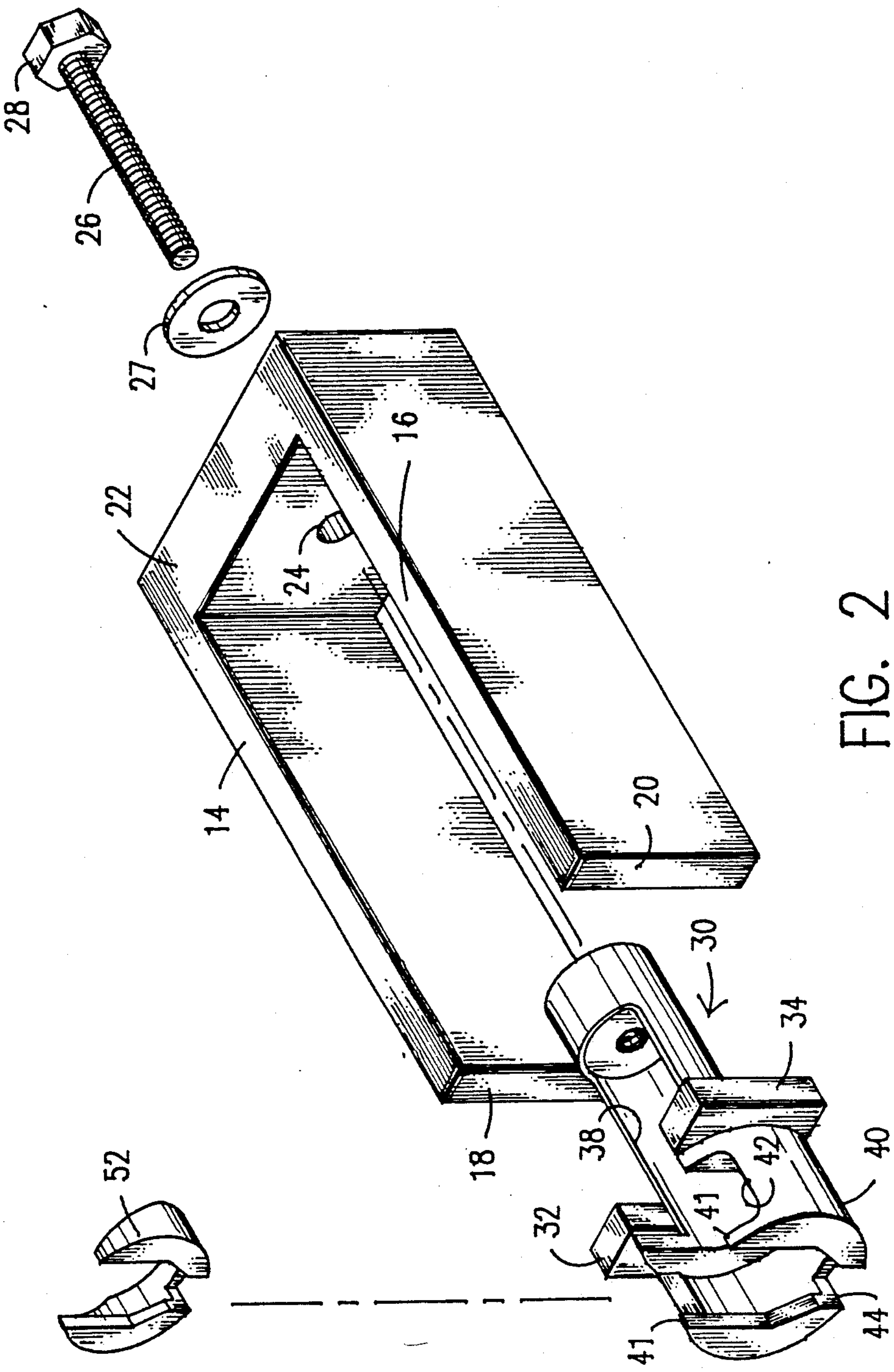
FIG. 2 is an exploded perspective view thereof.
Figure 3:
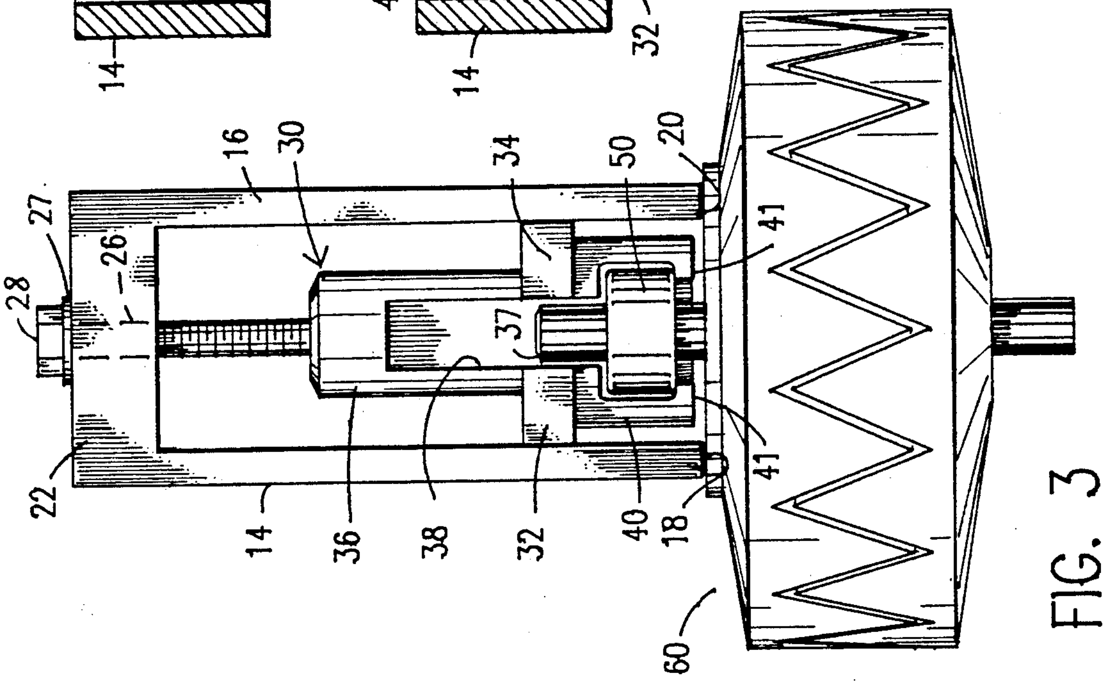
FIG. 3 is a plan view of the novel bearing puller at the beginning of a bearing pulling operation.

Legs 14, 16 are interconnected by member 22 of frame 12. Said interconnecting member 22 is bored but not tapped as at 24 as shown in FIG. 2 to freely receive elongate screw member 26. As also shown in FIG. 3, screw 26 has a multifaceted head part 28 fixedly thereto; head 28 is engagable by any suitable tool such as a socket wrench and rotation of said head effects simultaneous and corresponding rotation of screw 26. Washer 27 is provided to facilitate rotation of head 28.

Bearing gripper 30 is positioned intermediate legs 14, 16 as indicated in FIG. 1 and includes laterally extending wing members 32, 34 that maintain gripper 30 in a centered relation with respect to said leg members. More importantly, said wing members prevent rotation of gripper 30 about its longitudinal axis when screw 26 is turned. Wings 32, 34 are fixedly secured to gripper 30 and are not attached to their associated leg members.

Gripper 30 also includes a first elongate generally cylindrical part 36 having a first predetermined diameter and a first predetermined longitudinal extent. Internally threaded bore 37 is formed therein as clearly shown in FIG. 2 and screw threadedly receives screw 26. An elongate, longitudinally extending cut away opening 38 is also formed in part 36 to receive the alternator slip rings 37 as perhaps best understood in connection with FIG. 3. The circumferential extent of opening 38 is slightly greater than the diameter of the slip rings 37.

Gripper 30 has a cylindrical configuration and further includes a second cylindrical part 40, for receiving bearing 50, said bearing receiving part 40 being of truncate extent relative to the elongate extent of said first cylindrical part. Cut away part 42 formed in part 40 has a circumferential extent slightly greater than the diameter of bearing 50 to accommodate said bearing, as best shown in FIGS. 3 and 4.

A notch 44 is provided to accommodate structural parts of the alternator that would otherwise interfere with proper positioning of the puller 10.

Figure 4:
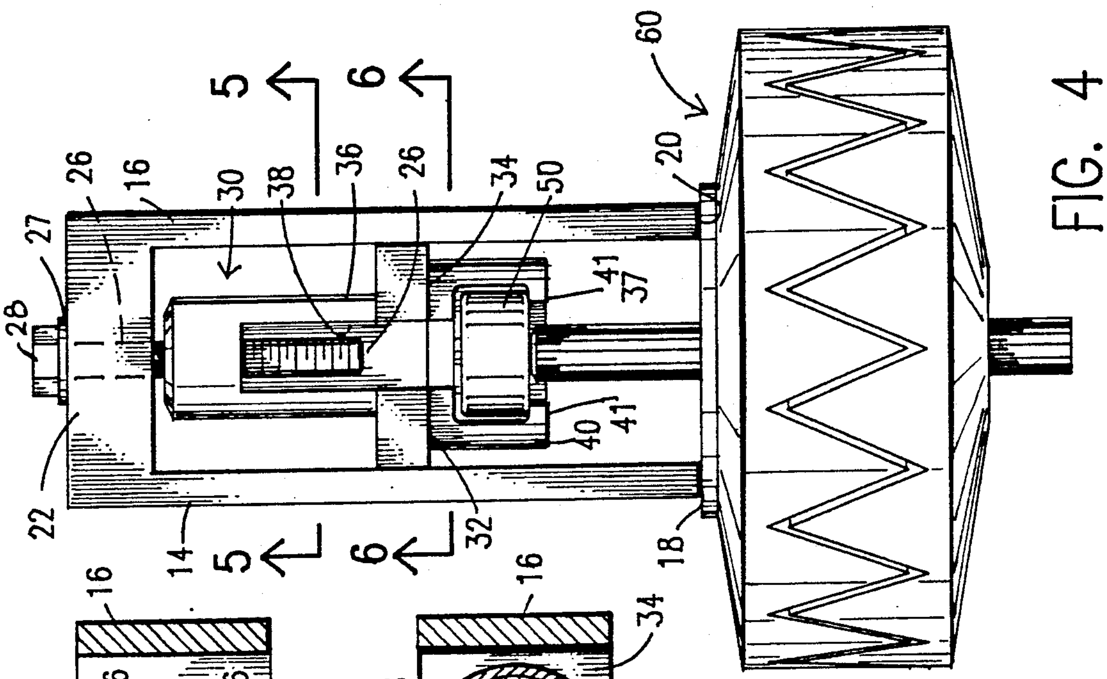
FIG. 4 is a plan view of the novel structure at the end of a bearing pulling operation.
Figure 5:
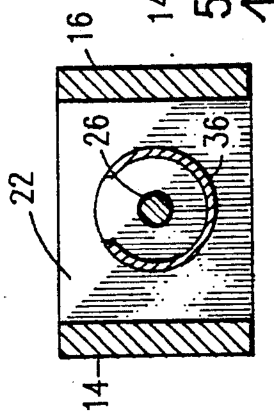
FIG. 5 is a sectional view taken along line 5—5 in FIG. 4.
Figure 6:
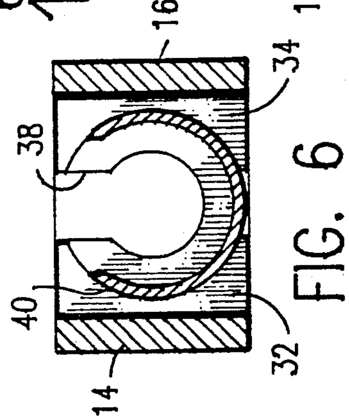
FIG. 6 is a sectional view taken along line 6—6 in FIG. 4.

Importantly, part 40 includes radially inwardly, circumferentially extending flange 41 formed at its leading edge; this flange exerts the pull on bearing 50 when screw 26 is rotated as should be understood upon comparison of FIGS. 3 and 4.

Those skilled in the mechanical arts will now appreciate that rotation of head 28 will effect retraction of bearing 50 from its shaft and that the slip rings 37 will remain unaffected by the extraction procedure. More particularly, the rotation of screw 26 about its rotational axis effects longitudinal travel of gripper 30 and hence of the bearing. This travel occurs because of the screw-threaded engagement of screw 26 and threaded bore 37. As is apparent from the figures, if bore 37 were not threaded, then rotation of screw 26 would have no affect upon gripper 30 and no bearing could be pulled. This is clear from an inspection of FIGS. 3 and 4 which show how gripper 30 travels longitudinally while screw 26 remains in its initial position. Note that head 28 is not displaced longitudinally when it is rotated. In other words, in comparing FIGS. 3 and 4, note that although gripper 30 and bearing 50 have displaced longitudinally, which longitudinal displacement is necessarily a result of the screw-threaded engagement of screw 26 and internally threaded bore 37, head 28 and screw 26 which are fixedly secured to one another as aforesaid, have not displaced longitudinally. Thus it is clear that bore 24 is unthreaded and that bore 37 is internally threaded, as shown in FIG. 2 as aforesaid.

An insert 52 (FIG. 2) is nestable in part 40 to accommodate a bearing of a smaller diameter than that depicted. A plurality of such inserts 52 could be provided to enable use of the inventive structure with bearings of differing diameters.

This invention is clearly new and useful. Moreover, it was not obvious to those of ordinary skill in the art at the time it was made, in view of the prior art taken as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. A bearing puller, comprising:

a generally "U" shaped rigid frame member;

said frame member having a pair of transversely spaced apart leg members of equal extent;

each of said leg members having a first end specifically configured and adapted to abuttingly engage an automotive alternator pole piece;

a transversely disposed interconnecting member disposed in interconnecting relation to said leg members at a second end thereof;

an unthreaded bore means being formed in said interconnecting member centrally thereof;

an elongate, externally threaded screw member that extends freely through said bore means;

a head member, configured for facile engagement by a tool, fixedly secured to a first end of said screw member so that rotation of said head member effects simultaneous and corresponding rotation of said screw member;

a bearing gripper member;

said bearing gripper member having a first generally cylindrical part having a first predetermined diameter and a first predetermined extent and a second generally cylindrical part having a second predetermined diameter and a second predetermined extent;

an internally threaded bore means being formed in said first cylindrical part;

said second cylindrical part having a radially inwardly and circumferentially extending flange formed at a leading end thereof;

a first longitudinally extending cut away part being formed in said first cylindrical part for receiving an alternator shaft carrying slip rings thereon, said first cut away part having a predetermined circumferential extent slightly greater than the diameter of said slip rings carried by said shaft;

a second longitudinally extending cut away part being formed in said second cylindrical part for receiving said alternator shaft and a bearing member carried thereby, said second cut away part having a predetermined circumferential extent slightly greater than the diameter of said bearing member;

said first and second cut away parts being in open communication with one another;

anti-rotation means for holding said gripper member against rotation when said head member is rotated; and said screw member being disposed in screw threaded engagement with said internally threaded bore means formed in said first cylindrical part;

whereby a bearing is removable from said shaft over said slip rings by inserting said bearing an slip rings into their respective cut away parts, placing the first ends of said leg members into abutting relation to a preselected alternator pole piece, and by turning said screw member.

2. The puller of claim 1, wherein said anti-rotation means includes a pair of laterally extending wing members that are mounted to said first cylindrical part and which have respective free ends disposed in slightly spaced relation to said leg members to prevent relative rotation therebetween.

* * * * *